United States Patent [19]
Jerrim et al.

[11] Patent Number: 5,218,683
[45] Date of Patent: Jun. 8, 1993

[54] METHOD AND APPARATUS FOR CONCEALING THE ENABLEMENT OF A DEVICE BY MODIFYING A STATUS WORD

[75] Inventors: John W. Jerrim, Duluth; Scott C. Swanson, Roswell, both of Ga.

[73] Assignee: Hayes Microcomputer Products, Inc., Norcross, Ga.

[21] Appl. No.: 873,966

[22] Filed: Apr. 24, 1992

Related U.S. Application Data

[63] Continuation of Ser. No. 428,870, Oct. 30, 1989, abandoned.

[51] Int. Cl.$^5$ .............................. G06F 9/00
[52] U.S. Cl. ........................ 395/325; 395/725; 364/259.7; 364/DIG. 1; 364/947.4; 364/DIG. 2
[58] Field of Search ........... 395/325, 725, 275; 364/259.7, DIG. 1, 947.4, DIG. 2

[56] References Cited

U.S. PATENT DOCUMENTS

| | | | |
|---|---|---|---|
| 4,124,889 | 11/1978 | Kaufman et al. | 364/200 |
| 4,159,516 | 6/1979 | Henrion et al. | 364/200 |
| 4,270,184 | 5/1981 | Shimokawa | 364/900 |
| 4,361,876 | 11/1982 | Groves | 364/900 |
| 4,400,769 | 8/1983 | Kaneda et al. | 364/200 |
| 4,860,244 | 8/1989 | Bruckert et al. | 395/275 |
| 4,931,922 | 6/1990 | Baty et al. | 364/200 |
| 4,975,828 | 12/1990 | Wishneusky et al. | 364/200 |

Primary Examiner—Michael R. Fleming
Assistant Examiner—Glenn A. Auve
Attorney, Agent, or Firm—Jones & Askew

[57] ABSTRACT

A status word modification device. A serial communications device (11) contains two universal asynchronous receiver transmitters (UARTs) (14, 15). Each UART contains a first in, first out (FIFO) buffer (14a), two status buffers (14b, 14c), and a FIFO control register (14d). If the applications program in the host (10) is an enhanced application program which supports the use of the FIFO buffer (14a), then the program will cause FIFO enablement instructions to be written into the control register (14d). In this case, the interface circuit (22) allows the status words to pass unaltered whenever the host (10) reads the status buffers (14b, 14c). However, if the applications program is a standard applications program which does not support the use of the FIFO buffer (14a), then the program will not write to the control register (14d). In this case, the interface circuit (22) will alter the value of selected bits of the status words if the user has enabled the FIFO buffer (14a) and the host reads the status buffers (14b, 14c). The alteration of the status word prevents the standard applications program from treating the FIFO-related bits in the status words as data errors.

21 Claims, 3 Drawing Sheets

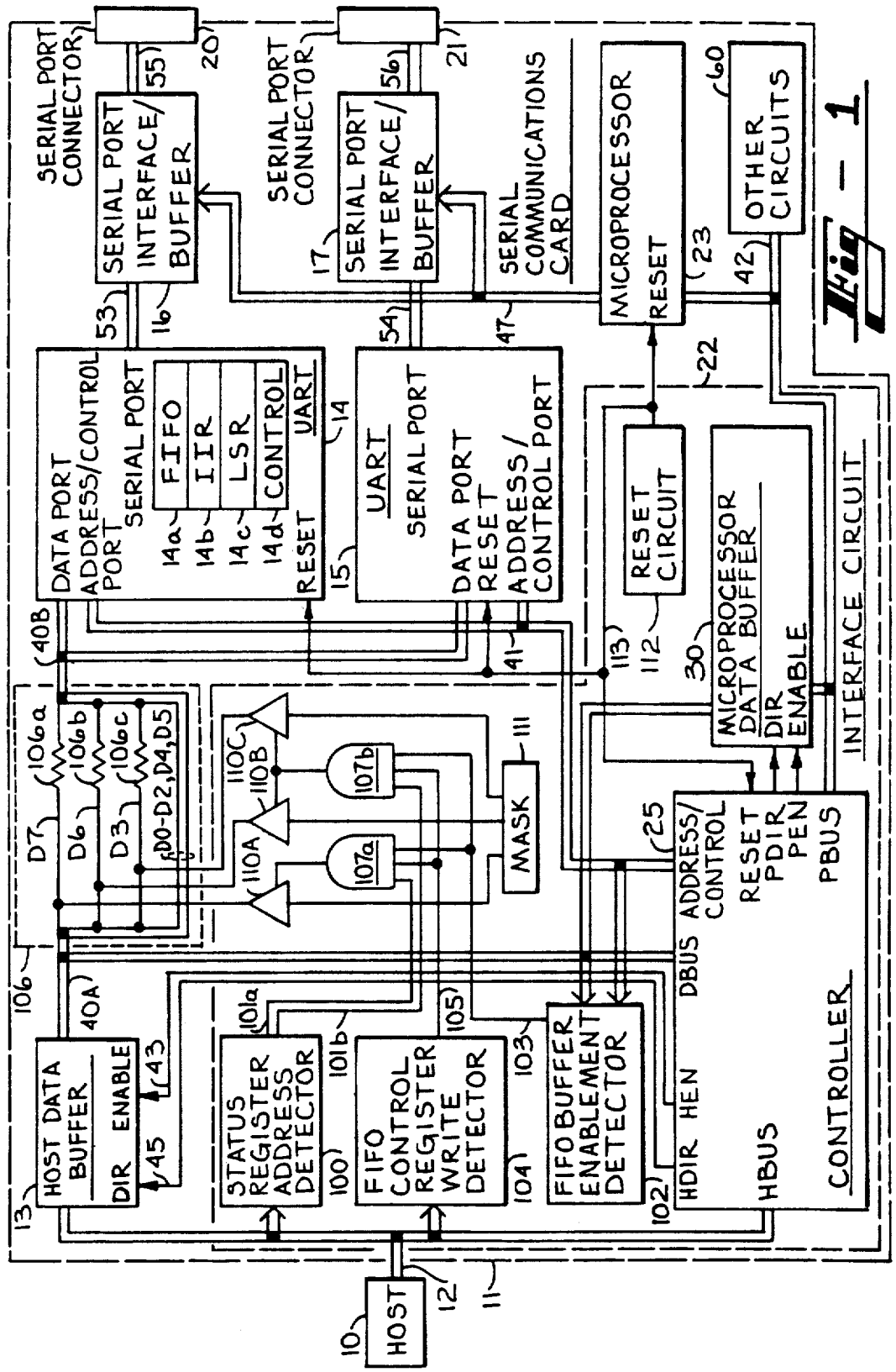

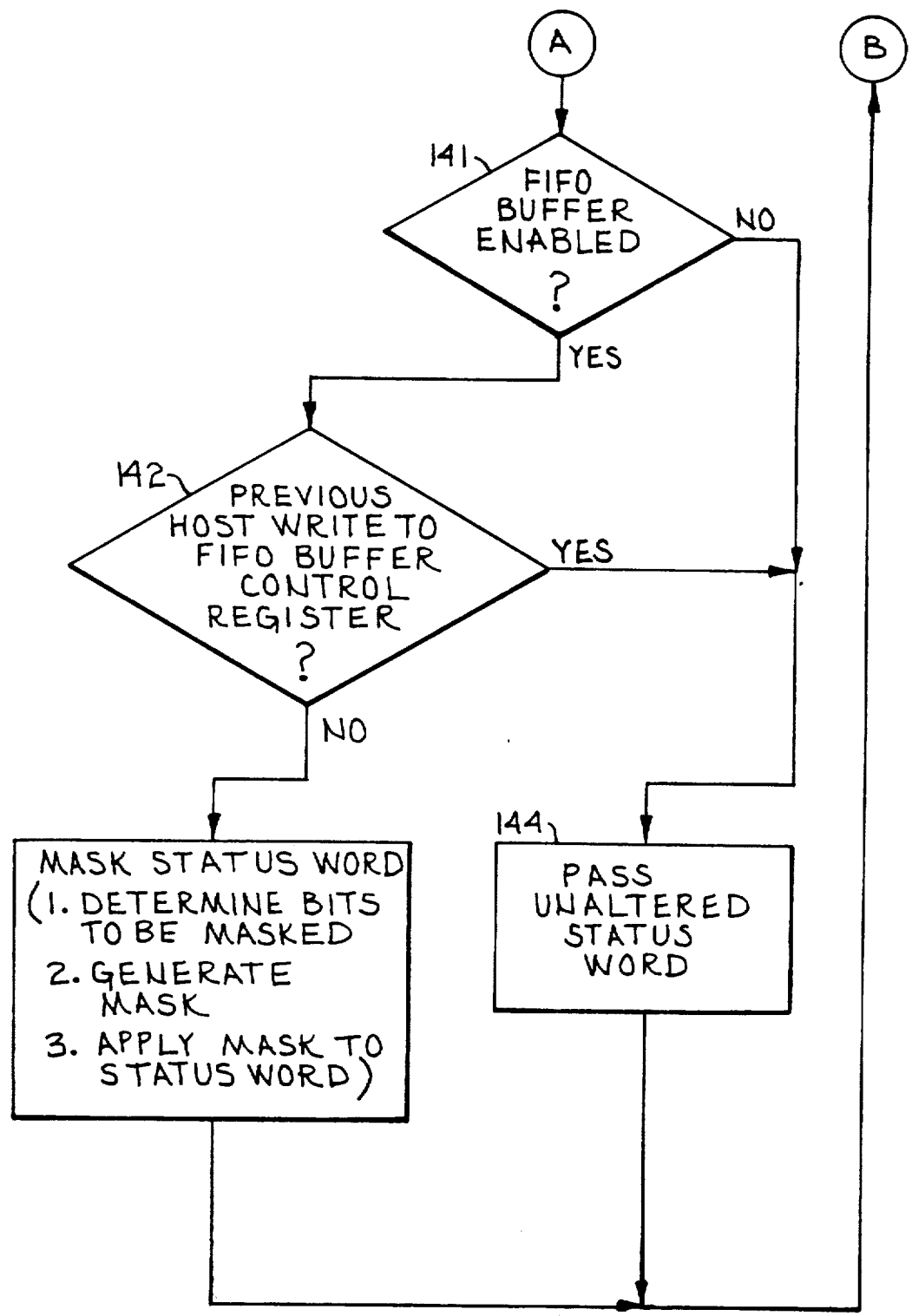
Fig — 2B

METHOD AND APPARATUS FOR CONCEALING THE ENABLEMENT OF A DEVICE BY MODIFYING A STATUS WORD

This is a continuation of application Ser. No. 428,870, filed Oct. 30, 1989 now abandoned.

TECHNICAL FIELD

The present invention relates to data communications devices and, more particularly, to serial communications cards which use a universal, synchronous receiver/transmitter.

BACKGROUND OF THE INVENTION

Data terminals, such as computers, typically use a parallel bus for the transfer of address, data and control information. However, peripheral devices connected to the host computer frequently use a serial data bus to communicate the data. A serial communications card is used to interface between the parallel data format used by the host and the serial data format used by the peripheral device. The serial communications card frequently contains a universal asynchronous receiver/transmitter, such as the National Semiconductor 8250 or the 16450, to perform the conversion between the different data formats. When the UART is receiving data from the peripheral device, such as a modem, it will generate an interrupt each time that a complete character has been received. The host computer must then read this character before the next complete character has been received or the character will be lost. If the serial data rate between the UART and the peripheral device is low, then the host computer will be able to service the interrupt with little or no delay. However, at higher data transfer rates, the host computer may not be able to service the interrupt quickly enough to prevent the loss of the current data character. The National Semiconductor 16550 UART provides a partial solution to this problem in that it contains a first in, first out (FIFO) buffer so that up to 16 characters may be accumulated without servicing before any data character is lost. Therefore, this buffer prevents the loss of received data when the host computer is occasionally too slow. This buffer may be enabled or disabled by an application program by writing to the FIFO enable bit in the UART FIFO register. When both the transmit FIFO and the receive FIFO are enabled, the UART sets bits 6 and 7 in the interrupt identification register, and may set bit 3 (interrupt ID bit 2) in the interrupt identification register and may set bit 7 (error in receiver FIFO) in the line status register. However, for the FIFOs to be used, the application program must enable the FIFO and must not object to the FIFO-related bits in the UART being set. However, most application programs currently available cannot enable the FIFO and, further, regard the setting of the FIFO-related bits as an error condition.

Therefore, there is a need for a method and apparatus for enabling the FIFO registers when the application program is incapable of doing so.

Furthermore, there is a need for a method and apparatus for preventing an existing application program from treating the setting of the FIFO-related bits as an error condition.

Therefore, there is a need for a serial communications card which uses a UART having a FIFO buffer, and which is compatible with programs that accommodate the FIFO feature in the UART, as well as programs which are incapable of accommodating the FIFO feature.

SUMMARY OF THE INVENTION

The present invention provides a serial communications card which uses a UART which has a FIFO buffer. The present invention maintains compatibility with existing applications or driver programs by masking bits related to the FIFOs in the interrupt identification register and the line status register whenever these registers are read by the host device applications program. If the driver program is compatible with a UART having a FIFO, then the driver program will be able to write to the UART FIFO control register. If the host device performs a UART FIFO control register write operation this signals the serial communications card that the driver program can properly process the FIFO enable bits and these bits will no longer be masked.

Furthermore, even though the driver program is incompatible with a UART containing a FIFO because the program cannot properly process the bits relating to the FIFOs, the user may wish to utilize the FIFOs in the UARTs so as to improve the efficiency of the data transfer operation, prevent data loss, etc. Therefore, the present invention also allows the user to send a command, through the host device, to the serial communications card which will cause the UART FIFOs to be enabled. The FIFO enable command sent by the user is different from the FIFO enable signal sent by a driver program. Therefore, the serial communications card can determine whether the driver program or the user enabled the FIFOs and mask, or not mask, respectively, the bits relating to the FIFOs when the host device reads the interrupt identification register or the line status register.

Therefore, it is object of the present invention to provide a serial communications card which uses a UART having a FIFO which is compatible with driver programs which are normally incompatible with UARTs having a FIFO.

It is a further object of the present invention to provide a serial communications card which uses a UART having a FIFO, the FIFO being selectably enabled or disabled by the user.

It is a further object of the present invention to provide a serial communications card using a UART having a FIFO, the FIFO being selectably enabled or disabled by a driver program in the host device.

To accomplish these objects, the present invention monitors whether the FIFO buffer is currently enabled or disabled, monitors whether the host device is attempting to read a status register, monitors whether the user or an applications program enabled the UART FIFOs, and does mask predetermined bits in the status word if the buffer was enabled by the user and not by the applications program and, otherwise, does not mask the status word.

The UART provides the status word over its data port. The status word comprises 8 bits, only some of which are related to the FIFOs. To mask the status word, an interface circuit overrides the UART output on the lines corresponding to these bits. Because the interface circuit will be trying to pull these data lines in one direction while the UART will be trying to pull the lines in another direction, resistors are inserted into these particular data lines at the UART output. These resistors allow the interface circuit to control these lines and prevent damage to the interface circuit or the UART. When masking is not required, the resistors have no effect on the data lines.

The present invention also allows the FIFO status, enabled or disabled, to be stored as part of a configuration profile so that, upon the occurrence of a reset signal, the configuration profile may be recalled. This eliminates the need for the user to enable or disable the FIFOs every time the system is turned on.

BRIEF DESCRIPTION OF THE DRAWING

FIG. 1 is a diagram of the preferred embodiment of the present invention in its preferred environment.

DETAILED DESCRIPTION

Figure 2A:
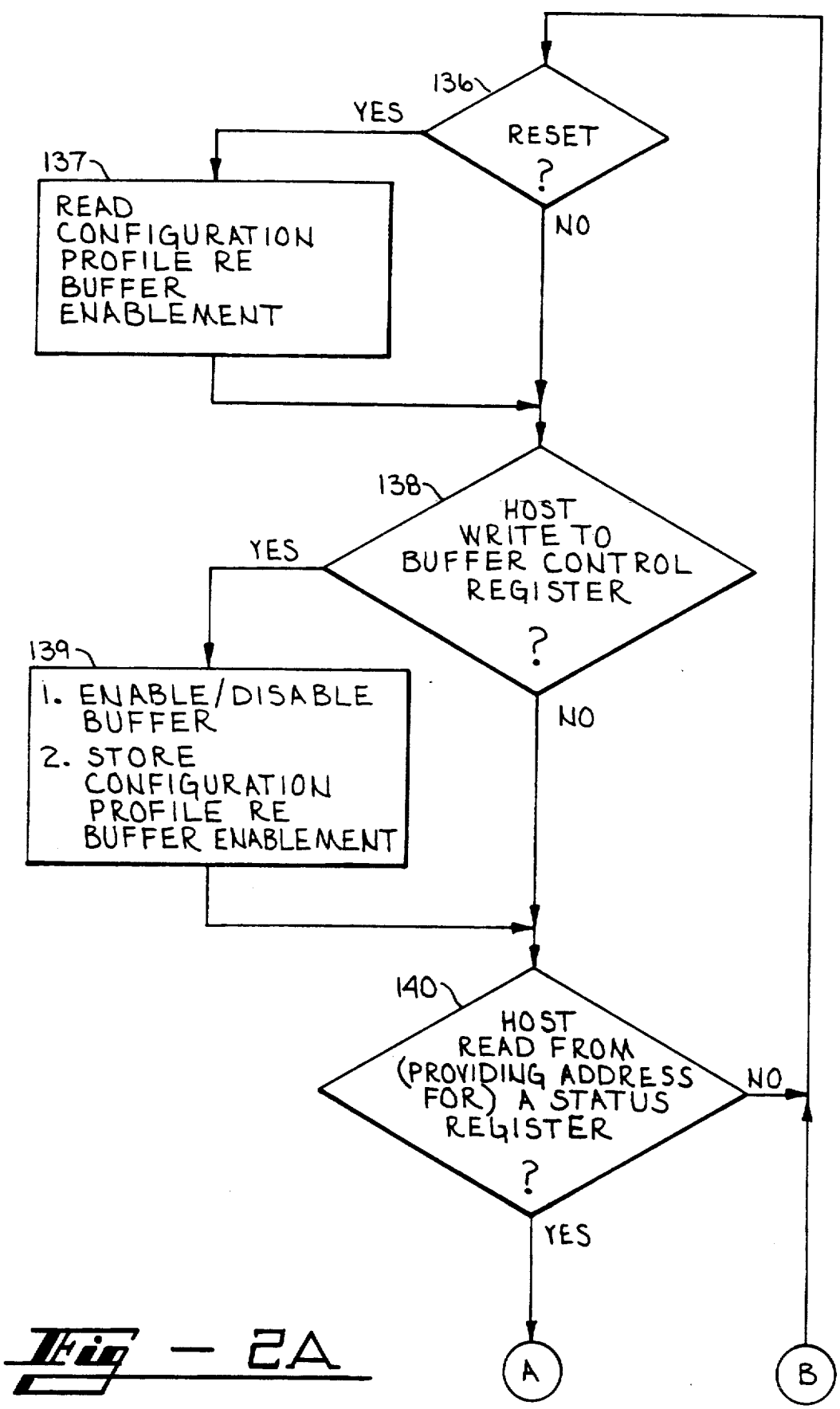
FIG. 2 is a flow chart of the operation of the interface circuit of the present invention.

Turn now to the drawing, in which like numerals represent like components throughout the several figures. FIG. 1 is a schematic diagram of the preferred embodiment of the present invention in its preferred environment. Host computer 10 is connected to a dual channel asynchronous serial communications card 11 via host bus 12, which represents the host 12 address, data and control buses. Card 11 is installed in an expansion slot in host 10. Card 11 contains a host data buffer 13, two National Semiconductor NS16550 universal asynchronous receiver transmitters (UARTs) 14 and 15, which are herein considered to be peripheral devices, two serial port interface/buffers 16 and 17, two serial port connectors 20 and 21, an interface circuit 22, and an Intel 8031 microprocessor 23. In the preferred embodiment, interface circuit 22 is implemented by a gate array. However, interface circuit 22 may, if desired, be implemented by a microprocessor. The construction and operation of interface circuit 22 will be apparent to one of ordinary skill in the art after a reading of the functions performed by interface circuit 22, described below. In the preferred environment host 10 is an IBM PS/2, XT, AT or PC, or other compatible computing machine. In the preferred environment serial port connectors 20 and 21 are each connected to a communication device (not shown), such as a modem. Serial port connectors 20 and 21 preferably define an EIA RS-232-D serial interface. UARTs 14 and 15 convert data between a serial data format on connectors 20 and 21 and a parallel data format on bus 40. UARTs 14 and 15 are connected to serial port interface/buffers 16 and 17, respectively, by buses 53 and 54, respectively. Buffers 16 and 17 are connected by buses 55 and 56, respectively, to serial port connectors 20 and 21, respectively. Buffers 16 and 17 perform standard buffering functions between UARTs 14 and 15, respectively, on one side and connectors 20 and 21, respectively, on another side. Microprocessor 23 is connected to interface/buffers 16 and 17 via control bus 47. Interface/buffers 16 and 17, in conjunction with UARTs 14 and 15 and microprocessor 23, also perform standard flow control functions as well as enhanced and automatic flow control functions. The flow control functions performed by interface/buffers 16 and 17 use the standard data terminal ready (DTR) and ready to send (RTS) signals of EIA RS-232-D.

Card 11 is designed to be compatible with existing software drivers which expect to find a single UART at a predetermined address. However, in the preferred environment host 10 contains driver software designed to use both UARTs on card 11 as well as the additional features provided by card 11. Some of these additional features are first in, first out (FIFO) buffers for both transmit and receive modes, automatic flow control for data incoming on serial port connectors 20 and 21, and direct memory access (DMA) data transfer of data between a memory in host 10 and the FIFOs in card 11. For additional details the reader is referred to co-pending U.S. patent application Ser. Nos. 07/428,858, 07/429,065, and 07/429,150, filed concurrently herewith.

Host 10 may use only UART 14 or UART 15, or may be using both UARTs simultaneously. Furthermore, one UART, such as UART 14, may be configured as a standard UART, such as the 8250 or the 16450, while the other UART, such as UART 15, may be independently configured to work with microprocessor 23 so that data transfers are by direct memory access. It will be noted that UARTs 14 and 15 share a common data bus 40 which connects them to host data buffer 13, controller 25, and microprocessor data buffer 30. Buffers 13 and 30 are bidirectional, three state buffers. UARTs 14 and 15 also share a common address/control bus 41, which connects them to controller 25. Host data buffer 13 and controller 25 are connected by host bus 12 to host 10. Similarly, controller 25 and microprocessor data buffer 30 are connected by processor bus 42 to microprocessor 23 and other circuits 60, such as memory devices and address latches.

Controller 25 of interface circuit 22 controls the access of host 10 and microprocessor 23 to buses 40 and 41 and therefore, to UARTs 14 and 15. Controller 25 also controls the direction of data flow through, and the operating state of, data buffers 13 and 30.

Bus 40 is broken into two parts. Part 40A connects host data buffer 13, FIFO buffer enablement detector circuit 102, controller 25, microprocessor data buffer 13, and bit masking device 106. Part 40B connects bit masking device 106 to the data ports of UARTs 14 and 15. Buses 40A and 40B are 8-bit bidirectional data buses. Bit masking device 106 allows interface circuit 22 to override predetermined bits placed on bus 40B by UARTs 14 and 15. Host data buffer 13 and microprocessor data buffer 30 control the access of host 10 and microprocessor 23 to data bus 40. Interface circuit 22, therefore, prevents bus contention problems between host 10 and microprocessor 23. As described in the data sheets for the NS16550, the UARTs contain a FIFO buffer 14a, an interrupt identification register 14b, a line status register 14c, and a FIFO control register 14d. For purposes of this application, FIFO buffer 14a represents both the transmit FIFO buffer and the receive FIFO buffer in UART 14. A status register address detector 100 and a FIFO control register write detector 104 are connected to host bus 12. Detector 100 monitors the signals from host 10 to determine if host 10 is accessing the interrupt identification register in UART 14 or 15. If so, then detector 100 provides a first enabling signal over conductors 101a and 101b to AND-gates 107a and 107b. FIFO control register write detector 104 monitors bus 12 to determine if the applications program has written information to the FIFO control register. If not, then detector 104 provides a second enabling signal over conductor 105 to gates 107a and 107b. FIFO buffer enablement detector 102 monitors the signals on bus 40A and on bus 41 to determine if either the host 10 or microprocessor 23 have enabled FIFO 14a. If FIFO 14a has been enabled, then detector 102 provides a third enabling signal over conductor 103 to gates 107a and 107b. If all three inputs to gates 107a and 107b are enabling, then gates 107a and 107b enable three-state buffers 110A-110C. When buffers 110 are enabled then mask 111 is placed upon lines D3, D6 and D7 of bus 40A. Resistors 106a through 106c, which are part of bit masking device 106, allow buffers 110A-110C to override the information provided by UARTs 14 and 15. Resistors 106a-106c also prevent damage to the outputs of UARTs 14 and 15 and interface circuit 22 by limiting the current flow when these outputs are in opposite states. U.S. Pat. No. 4,322,827, issued Mar. 30, 1982, to Weber discloses using resistors and three-state buffers on the output of a shift register to obtain a normal or shifted output.

In the preferred embodiment, resistors 106 each have a value of 1,000 ohms. This value is not critical and other values may be used. However, the values which are too low will cause excessive heat dissipation and possible damage to buffers 110 and UARTs 14 and 15, while values which are too high, when coupled with the capacitance of bus 40A and the devices connected thereto, may reduce the bandwidth to a point where data errors occur. It will be appreciated that if buffers 110 are disabled, then the outputs of UARTs 14 and 15 will pass, relatively unimpeded, through resistors 106 to host data buffer 13, whereby they are passed on to host 10. However, if buffers 110 are enabled, then they will sink or source sufficient current through resistors 106 to override the outputs of UARTs 14 and 15. Therefore, the logic values placed on data lines D3, D6 and D7 will be those values determined by mask 111, and not the actual values in the selected register of UARTs 14 and 15.

The operation is similar if the host is accessing the line status register in UART 14 or 15. However, in this case, detector 100 only enables gate 107a and buffer 110A so only data line D7 is affected. Therefore, in the preferred embodiment, if the values provided by UART 14 and 15 are to be overridden, bits 3, 6 and 7 are overridden if the interrupt identification register is to be read and bit 7 is overridden if the line status register is to be read. In the preferred embodiment, overriding is performed by setting the selected bits to a logic zero. Therefore, gates 107, buffers 110, and mask 111 may be implemented by three 3-input NAND gates with open collector outputs.

Assume first that host 10 uses an applications or driver program which does not support the use of FIFOs in UARTs 14 and 15. Also assume that, at this point, the user has taken no action to enable the FIFOs in UARTs 14 and 15. In this case, both detectors 102 and 104 would disable gates 107a and b, thereby causing the outputs of buffers 110 to be open circuits. Therefore, when host 10 reads the values in the interrupt identification register 14b or the line status register 14c, the values of these registers will pass unaltered to host 10.

Assume now that the user has sent, through host 10, an instruction to the serial communications card 11 to enable FIFO 14a. Detector 102 will place on conductor 103 an enabling signal for gates 107. Furthermore, detector 104 will place on conductor 105 an enabling signal for gates 107 since, even though the FIFO control register has been written to, it was not written to using the instructions that the applications or driver program would be required to use. Now, when host 10 attempts to read interrupt identification register 14b, detector 100 will enable gates 107 which, in turn, will cause buffers 110 to place the value of mask 111 onto the D3, D6 and D7 lines of bus 40A. Therefore, the applications program in host 10 will see a status word indicating that the FIFOs were neither present nor enabled. A similar result occurs if the applications or driver program attempts to read line status register 14c but, in this case, only line D7 is overridden.

Assume now that the applications or driver program is of the type which can accommodate a UART having a FIFO. Assume also that the applications or driver program has written to FIFO control register 14d. In this case, detector 104 will disable gates 107 which, in turn, will disable buffers 110. Therefore, the program in host 10 will see the actual values provided by the selected register in the UART 14 or 15.

Therefore, the present invention accommodates existing applications programs which are incompatible with UARTs having FIFOs as well as applications programs which can accommodate UARTs having FIFOs.

Even though the applications program is incapable of enabling the FIFOs, the user may do so via host 10. In this case the user causes host 10 to write a predetermined data word to a predetermined I/O address, which sends an instruction to microprocessor 23 to enable the FIFOs. The signals on bus 12 required to accomplish the FIFO enable in this manner are different than the signals on bus 12 which the applications the driver program would use to directly load FIFO control register 14d. Therefore, FIFO control register write detector 104 can easily determine whether the applications program or the user enable the FIFOs.

A reset circuit 112 is connected by conductor 113 to the reset input of controller 25, microprocessor 23, and UARTs 14 and 15. Circuit 112 initiates a reset function when power is first applied to the serial communications card. Furthermore, a software reset can be accomplished by sending the proper signal from host 12 to microprocessor 23. In the preferred embodiment, microprocessor 23 stores, in other circuits 60 which contains memory, the control values which have previously been stored in UARTs 14 and 15. Therefore, after a reset condition, UARTs 14 and 15 have the same configuration parameters as were selected by the user or applications program, as appropriate, as before the reset condition.

Turn now to FIG. 2 which is a flow chart of the operation of the interface circuit of the present invention. Decision 136 determines whether a reset condition is present. If not, then decision 138 is executed. If so, then the configuration profile is read from memory to determine whether the buffer is to be enabled, and then decision 138 is executed. Decision 138 determines whether the host is sending a command to enable the buffer, such as by writing to the buffer control register. If not, then decision 140 is executed. If so, then in step 139 the buffer is enabled or disabled, as selected by the host, by writing the instruction to the buffer control register, the configuration profile regarding the status of buffer enablement is stored, and then decision 140 is executed. Decision 140 determines whether the host 10 is reading from a predetermined status register, such as the interrupt identification register 14b or the line status register 14c of FIG. 1. If not, then a return is made to decision 136. If so, then decision 141 determines whether the FIFO buffer has been enabled. If not, then the status word is passed 144 unaltered to the host 10. However, if the FIFO buffer has been enabled, then decision 142 determines whether there has been a previous write to the FIFO buffer control register by the driver or applications program. If so, then in step 144 the status word is passed unaltered to host 10. However, if not, then at step 143, the status word is masked to conceal the operation of the FIFOs and the masked status word is provided to host 10. The bits of the status word which are masked depend, as previously described, on which status register is being read. Steps 143 and 144 both return to decision 136. Therefore, if the FIFO buffer is not enabled, or if the FIFO buffer is enabled and the host has written to the buffer control register, then the status word is passed unaltered. However, if the FIFO buffer is enabled, but this was not done by the applications program, then the masked status word is passed to the host. Therefore, an applications or driver program always receives a status word with which it is compatible.

From the above, it will be appreciated that the present invention describes a method and apparatus for concealing the enablement of a FIFO buffer in a UART so that a serial communications card containing a UART having a FIFO buffer will function properly both with applications programs which are incompatible with the UART having a FIFO and with applications programs which are compatible with a UART having a FIFO. It will also be appreciated that the present invention accomplishes this function by, in selected cases, masking bits which pertain to the FIFO registers in the UART. It will also be appreciated that the masking may also be accomplished by conventional means rather than by the resistor and three-state buffer technique described. Although the preferred of the present invention has been described with particularity it will be understood that numerous modifications and variations are possible. Accordingly, the scope of the present invention is to be limited only by the claims below.

What is claimed is:

1. For use with a system having a host device connected by a bus to a peripheral device, said peripheral device comprising a status register and a buffer for temporarily storing data, said buffer being selectably enabled, said status register providing a status word, said status word being a first status word having predetermined bits in predetermined first states when said buffer is not enabled and being a second status word having said predetermined bits in predetermined second states when said buffer is enabled, an apparatus for selectably making an enablement of said buffer transparent to said host device, comprising:

first means connected to said bus for providing a first signal in response to said host device placing on said bus an address corresponding to said status register;

second means connected to said bus for providing a second signal in response to said host device placing on said bus signals which cause said buffer to be enabled; and third means, connected to said first means and to said second means and interposed between said bus and said peripheral device, responsive to said first signal and said second signal for placing on said bus a masked status word to said host device by masking predetermined bits from said status register, so that predetermined bits of said masked status word are in said predetermined first states.

2. The apparatus of claim 1 wherein said bus comprises a plurality of data bit lines and said third means comprises:

a plurality of resistors connected between said peripheral device and said bus, each resistor of said plurality of resistors being connected into a predetermined one of said data bit lines; and fourth means connected to said bus at a point between said host device and said plurality of resistors and connected to said first means and to said second means and responsive to said first signal and said second signal for forcing said predetermined ones of said data bit lines into said first states.

3. The apparatus of claim 1 wherein said peripheral device further comprises a buffer control register and said apparatus further comprises:

fourth means connected to said bus for providing a third signal in response to said host device placing on said bus signals which cause writing to said buffer control register; and said third means is connected to said fourth means and is responsive to said third signal being in a first state for providing said masked status word, and responsive to said third signal being in a second state for allowing said status word from said status register to pass unaltered to said host device.

4. The apparatus of claim 3 and further comprising processor means connected to said bus for enabling said buffer in response to a command from said host device.

5. The apparatus of claim 4 wherein said processor means stores a configuration profile, said configuration profile being read by said processor means in response to a reset signal, said configuration profile including an indication that said host device has previously instructed said processor means to enable said buffer.

6. The apparatus of claim 4 wherein said processor means enables said buffer by writing to said buffer control register.

7. An apparatus for use with a host device, comprising:

a peripheral device connected by a bus to said host device and comprising a status register and a buffer for temporarily storing data, said buffer being selectably enabled, said status register providing a status word, said status word being a first status word having predetermined bits in predetermined first states when said buffer is not enabled and being a second status word having said predetermined bits in predetermined second states when said buffer is enabled;

first means connected to said bus for providing a first signal in response to said host device placing on said bus an address corresponding to said status register, second means connected to said bus for providing a second signal in response to said host device placing on said bus signals which cause said buffer to be enabled; and third means, connected to said first means and to said second means and interposed between said bus and said peripheral device, responsive to said first signal and said second signal for placing on said bus a masked status word to said host device by masking predetermined bits from said status register, so that predetermined bits of said masked status word are in said predetermined first states.

8. The apparatus of claim 7 wherein said bus comprises a plurality of data bit lines and said third means comprises:

a plurality of resistors connected between said peripheral device and said bus, each resistor of said plurality of resistors being connected into a predetermined one of said data bit lines; and fourth means connected to said bus at a point between said host device and said plurality of resistors and connected to said first means and to said second means and responsive to said first signal and said second signal for forcing said predetermined ones of said data bit lines into said predetermined first states.

9. The apparatus of claim 7 wherein said peripheral device further comprises a buffer control register and said apparatus further comprises:

fourth means connected to said bus for providing a third signal in response to said host device placing on said bus signal which cause writing to said buffer control register; and said third means is connected to said fourth means and is responsive to said third signal being in a first state for providing said masked status word, and responsive to said third signal being in a second state for allowing said status word from said status register to pass unaltered to said host device.

10. The apparatus of claim 9 and further comprising procesor means connected to said bus for enabling said buffer in response to a command from said host device.

11. The apparatus of claim 10 wherein said processor means stores a configuration profile, said configuration profile being read by said processor means in response to a reset signal, said configuration profile including an indication that said host device has previously instructed said processor means to enable said buffer.

12. The apparatus of claim 10 wherein said processor means enables said buffer by writing to said buffer control register.

13. The apparatus of claim 7 wherein said peripheral device comprises a universal asynchronous receiver transmitter.

14. The apparatus of claim 13 wherein said buffer is a first in, first out buffer.

15. The apparatus of claim 7 wherein said buffer is a first in, first out buffer.

16. For use with a system having a host device connected by a bus to a peripheral device having a status register and a buffer for temporarily storing data, said buffer being selectably enabled, said status register providing a status word, said status word being a first status word having predetermined bits in predetermined first states when said buffer is not enabled and being a second status word having said predetermined bits in predetermined second states when said buffer is enabled, a method for selectably making an enablement of said buffer transparent to said host device, comprising the steps of:

providing a first signal responsive to said host device placing on said bus an address corresponding to said status register;

providing a second signal responsive to said host device placing on said bus signals which cause said buffer to be enabled;

generating a masked status word in response to said first signal and said second signal by masking predetermined bits from said status register, so that predetermined bits of said masked status word are in said predetermined first states; and providing said masked status word to said host device.

17. The method of claim 16 wherein said data bus comprises a plurality of data bit lines and said step of generating a masked status word comprises forcing predetermined ones of said data bit lines into said predetermined first states.

18. The method of claim 16 wherein said peripheral device further comprises a buffer control register and said method further comprises:

providing a third signal responsive to said host device writing to said buffer control register;

responding to said third signal being in a first state by providing said masked status word; and responding to said third signal being in a second state by allowing said status word from said status register to pass unaltered to said host device.

19. The method of claim 16 wherein said system further comprises a processor and said method further comprises sending a command from said host device to said processor to enable said buffer.

20. The method of claim 19 and further comprising storing a configuration profile indicative of whether said buffer has been enabled.

21. The method of claim 20 and further comprising reading said configuration profile in response to a reset condition.

* * * * *